United States Patent
Bett et al.

(10) Patent No.: US 6,391,952 B1
(45) Date of Patent: May 21, 2002

(54) WATER-REDISPERSIBLE FILM-FORMING POLYMER POWDERS PREPARED FROM ETHYLENICALLY UNSATURATED MONOMERS AND CONTAINING NAPHTHALENESULPHONATES

(75) Inventors: William Bett, Paris; Jean-Francois Colombet, Rueil Malmaison, both of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/509,762

(22) PCT Filed: Jul. 9, 1999

(86) PCT No.: PCT/FR99/01692

§ 371 Date: May 30, 2000

§ 102(e) Date: May 30, 2000

(87) PCT Pub. No.: WO00/06641

PCT Pub. Date: Feb. 10, 2000

(30) Foreign Application Priority Data

Jul. 30, 1998 (FR) .............................. 98/09779

(51) Int. Cl.[7] .......................... C08K 5/42; C08L 57/00; C08J 3/00
(52) U.S. Cl. ............... 524/160; 524/5; 524/2; 524/171; 524/366; 524/342
(58) Field of Search .......................... 524/2, 5, 160, 524/171, 342, 366

(56) References Cited

U.S. PATENT DOCUMENTS 3,397,232 A * 8/1968 Takagi et al. ................ 260/561
5,369,198 A * 11/1994 Albercht et al. ............. 526/240

FOREIGN PATENT DOCUMENTS

| DE | 40 27 667 | 3/1991 | ............ C08G/14/12 |
| EP | 0 610 699 | 8/1994 | ......... C08F/222/20 |
| FR | 2 066 499 | 8/1971 | ............ C08G/22/00 |
| FR | 2 075 550 | 10/1971 | ............ C08F/45/00 |
| FR | 2 115 751 | 7/1972 | ............ C04B/13/00 |
| WO | WO 97 25371 | 7/1997 | ............ C08K/5/17 |

OTHER PUBLICATIONS

Patent Abstracts of Japan—vol. 095, No. 011, Dec. 26, 1995, & JP 07 207179 A (Sanyo Shikiso KK). Aug. 08, 1995.

* cited by examiner

Primary Examiner—David W. Wu
Assistant Examiner—Kelechi Egwim

(57) ABSTRACT

A water-redispersible powder composition comprising: at least a water-soluble film forming polymer, the polymer being prepared from at least an ethylenically unsaturated monomer; and at least a naphthalenesulphonate.

23 Claims, No Drawings

WATER-REDISPERSIBLE FILM-FORMING POLYMER POWDERS PREPARED FROM ETHYLENICALLY UNSATURATED MONOMERS AND CONTAINING NAPHTHALENESULPHONATES

This application is an application under 35 U.S.C. Section 371 of International Application No. PCT/FR99/01692, filed on Jul. 09, 1999.

The present invention relates to water-redispersible powders of film-forming polymers prepared from monomers with ethylenic unsaturation.

Film-forming polymers prepared from monomers with ethylenic unsaturation are frequently used as adjuvants in hydraulic inorganic binder compositions in order to improve the processing thereof and the properties after hardening, such as adhesion to various substrates, leaktightness, flexibility or mechanical properties. They are generally provided in the form of aqueous dispersions (latices).

They can also be provided in the form of powders, it being possible for the said powders to be redispersed in water. Redispersible polymer powders exhibit the advantage, with respect to aqueous dispersions, of being able to be premixed with cement in the form of ready-for-use pulverulent compositions which can be used, for example, for the manufacture of mortars and concretes intended to be applied to construction materials, for the manufacture of bonding mortars or for the production of protective or decorative coatings inside or outside buildings.

These redispersible powders are obtained by spraying and drying dispersions of film-forming polymers, generally acrylic polymers. In order to obtain readily redispersible polymer powders, provision has been made to add to the dispersions, before spraying, melamine-formaldehyde-sulphonate (U.S. Pat. No. 4,784,648) or naphthalene-formaldehyde-sulphonate (DE-A-3,143,070) condensation products and/or vinylpyrrolidone-vinyl acetate copolymers (EP-78,449).

These additives have the disadvantage of being complicated to synthesize, due to the synthesis of a first product and then to its condensation with another.

The aim of the present invention is to provide a novel pulverulent composition which is completely or virtually completely redispersible in water and which is based on a film-forming polymer prepared from monomers with ethylenic unsaturation.

Another aim of the present invention is to provide a process for the preparation of the powders of above type from film-forming polymer latices.

Another aim of the present invention is to provide a redispersible powder of the above type which, in the powder form or after optional redispersion in water in the form of a reconstituted latex, can be used in all the fields of application of latices for producing coatings (in particular paints or composition for the coating of paper) or adhesive compositions (in particular pressure-sensitive adhesives or tiling adhesives).

Another aim of the present invention is to provide a redispersible powder of the above type (or the reconstituted latex resulting therefrom) with a view more particularly to its use as additives in formulations with a hydraulic binder (cement or plaster) of the grout, mortar or concrete type, in order to improve the properties thereof: adhesion to various supports, impact and abrasion strengths, flexural and compressive strengths, or flexibility.

These aims and others are achieved by the present invention, which relates to a water-redispersible pulverulent composition comprising:

at least one water-insoluble film-forming polymer, the said polymer (a) being prepared from at least one monomer with ethylenic unsaturation, and at least one naphthalenesulphonate (b) of general formula (I):

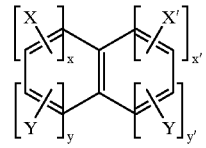

in which:

X and X', which are identical or different, represent OH or $NH_2$,

Y represents $SO_3^-M^+$, with M alkali metal, $x \geq 0$, $x' \geq 0$ and $x+x' \geq 1$, $y \geq 0$, $y' \geq 0$ and $y+y' \geq 1$.

The invention also relates to a process for the preparation of such a redispersible pulverulent composition, in which process the water is removed from an aqueous dispersion of the water-insoluble film-forming polymer (a) prepared by emulsion polymerization and comprising appropriate amounts of naphthalenesulphonate (b) of formula (I) and optionally of polyphenol (c), of ethoxylated surface-active agent (d) and of inorganic filler (e).

The invention therefore first of all relates to a water-redispersible pulverulent composition comprising:

at least one water-insoluble film-forming polymer, the said polymer (a) being prepared from at least one monomer with ethylenic unsaturation, and at least one naphthalenesulphonate (b) of general formula (I):

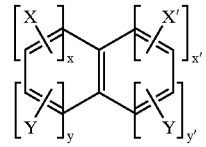

in which:

X and X', which are identical or different, represent OH or $NH_2$,

Y represents $SO_3^-M^+$, with M alkali metal, $x \geq 0$, $x' \geq 0$ and $x+x' \geq 1$, $y \geq 0$, $y' \geq 0$ and $y+y' \geq 1$.

In the composition according to the invention, the water-insoluble film-forming polymer (a) is prepared from monomers with ethylenic unsaturation.

The glass transition temperature (Tg) of the film-forming polymer (a) can be between approximately −20° C. and +50° C., preferably between −10° C. and +40° C. This polymer can be prepared in a way known per se by emulsion polymerization of monomers with ethylenic unsaturation using polymerization initiators in the presence of conventional emulsifying and/or dispersing agents. The content of polymer in the emulsion is generally between 30 and 70% by weight, more specifically between 35 and 65% by weight.

Mention may be made, as monomers of use in the synthesis of the film-forming polymer (a), of:

vinyl esters and more particularly vinyl acetate;

acrylic esters, such as alkyl acrylates and methacrylates, the alkyl group of which comprises from 1 to 10 carbon atoms, for example methyl, ethyl, n-butyl or 2-ethylhexyl acrylates and methacrylates;

vinylaromatic monomers, in particular styrene.

These monomers can be copolymerized with one another or with other monomers with ethylenic unsaturation.

Mention may be made, as non-limiting examples of monomers copolymerizable with vinyl acetate and/or acrylic esters and/or styrene, of ethylene and olefins such as isobutene; vinyl esters of branched or unbranched saturated monocarboxylic acids having from 1 to 12 carbon atoms, such as vinyl propionate, vinyl "Versatate" (registered trade name for branched $C_9$–$C_{11}$ acid esters), vinyl pivalate or vinyl laurate; esters of unsaturated mono- or dicarboxylic acids having 3 to 6 carbon atoms with alkanols having 1 to 10 carbon atoms, such as methyl, ethyl, butyl or ethylhexyl maleates or fumarates; vinylaromatic monomers, such as methylstyrene or vinyltoluene; vinyl halides, such as vinyl chloride or vinylidene chloride; or diolefins, particularly butadiene.

It is also possible to add, to the monomers defined above, at least one other monomer chosen from the following list: acrylamide, sodium 2-acrylamido-2-methylpropanesulphonate (AMPS) or sodium methallylsulphonate. These monomers are added in an amount of at most 2% by weight with respect to the total weight of the monomers. These monomers are added during the polymerization; they ensure the colloidal stability of the latex.

The water-insoluble film-forming polymer is preferably chosen from:

vinyl or acrylate homopolymers, vinyl acetate, styrene/butadiene, styrene/acrylate or styrene/butadiene/acrylate copolymers.

The polymerization of the monomers is generally carried out in an emulsion in the presence of an emulsifier and of a polymerization initiator.

The monomers employed can be introduced as a mixture or separately and simultaneously into the reaction mixture, either before the beginning of the polymerization, in a single step, or during the polymerization, in successive fractions or continuously.

Use is generally made, as emulsifying agent, of conventional anionic agents represented in particular by salts of fatty acids, alkali metal alkyl sulphates, alkylsulphonates, alkylaryl sulphates, alkylarylsulphonates, aryl sulphates, arylsulphonates, sulfosuccinates or alkyl phosphates, or hydrogenated or non-hydrogenated salts of abietic acid. They are generally employed in a proportion of 0.01 to 5% by weight with respect to the total weight of the monomers.

The emulsion polymerization initiator is represented more particularly by hyroperoxides, such as hydrogen peroxide, cumene hydroperoxide. diisopropylbenzene hydroperoxide, para-menthane hydroperoxide or tert-butyl hydroperoxide, and by persulphates, such as sodium persulphate, potassium persulphate or ammonium persulphate. It is employed in an amount of between 0.05 and 2% by weight with respect to the total of the monomers. These initiators are optionally used in combination with a reducing agent, such as sodium bisulphite or formaldehydesulphoxylate, polyethyleneimines, sugars (dextrose or sucrose) or metal salts. The amount of reducing agent used varies from 0 to 3% by weight with respect to the total weight of the monomers.

The reaction temperature, which is a function of the initiator employed, is generally between 0 and 100° C. and preferably between 30 and 90° C.

A transfer agent can be used in proportions ranging from 0 to 3% by weight with respect to the monomer(s), the transfer agent generally being chosen from mercaptans, such as n-dodecyl mercaptan or tert-dodecyl mercaptan, cyclohexene or halogenated hydrocarbons, such as chloroform, bromoform or carbon tetrachloride. It makes it possible to adjust the length of the molecular chains. It is added to the reaction mixture either before the polymerization or during polymerization.

The pulverulent compositions according to the invention additionally comprise at least one naphthalenesulphonate (b) of general formula (I). More specifically, this compound (b) is a naphthalenesulphonate of an alkali metal which is substituted by at least one amino and/or hydroxyl group.

In agreement with the general formula (I), this naphthalenesulphonate (b) comprises at least one sulphonate functional group. If several sulphonate functional groups are present, they can be on either benzene ring.

In addition, this naphthalenesulphonate (b) of general formula (I) is functionalized by at least one hydroxyl and/or amino functional group, these functional groups being present on either benzene ring.

The alkali metal is generally sodium.

Monosulphonated and 1,4-functionalized naphthalenesulphonates (b) are preferred. Thus, the preferred naphthalenesulphonates (b) of general formula (I) are sodium 4-amino-1-naphthalenesulphonate and sodium 1-naphthol-4-sulphonate.

The content by weight of the naphthalenesulphonate (b) of the formula (I) with respect to the polymer (a) is generally between 2 and 40%, preferably between 8 and 22%.

According to a specific form of the invention, the pulverulent composition can comprise a synthetic or natural polyphenol (c). The term "polyphenol" is understood to mean the products resulting from the condensation of sulphonated phenols with formaldehyde.

These polyphenols are generally synthesized from optionally substituted phenols. These phenols are sulphonated by being brought into contact with sulphuric acid and then condensed with formaldehyde or else, conversely, condensed with formaldehyde and then sulphonated. The sulphonation can be a sulpho-alkylation: it makes possible the introduction of $SO_3H$ or alkyl-$SO_3H$ groups onto the benzene ring. Following the condensation or the sulphonation, the polyphenols obtained can be subjected to other reactions, it is possible, for example, to neutralize using an alkaline salt or an amine.

Use may be made of an unsubstituted phenol or substituted phenols, for example: halophenols, such as chlorophenols, alkylphenols, such as cresols or xylenols, resorcinol, pyrogallol, naphthols, or alternatively bisphenols, such as dihydroxydiphenylpropane or dihydroxydiphenol sulphones. It preferably relates to dihydroxydiphenyl sulphones.

Concentrated sulphuric acid is generally used for the sulphonation and formaldehyde solution for the condensation.

According to a first preferred alternative form, the polyphenol (c) results:

from the condensation of formaldehyde and of a compound of general formula (II):

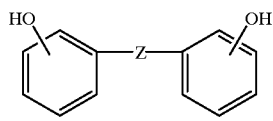

(II)

in which Z represents SO$_2$, O, CH$_2$, CO, S or NR, with R representing H or an alkyl group, and from the sulphomethylation of the condensate obtained.

The sulphomethylation stage introduces CH$_2$SO$_3^-$M$^+$ groups onto at least one benzene ring of the condensate, M representing an alkali metal, generally sodium. Z preferably represents SO$_2$.

This polyphenol can be obtained by carrying out the following stages:

synthesis of a sulphone by reaction of an excess of phenol with respect to the sulphuric acid (at least 2 mol of phenol per mole of sulphuric acid) at high temperature, preferably greater than 150° C., neutralization of the sulphone with sodium hydroxide, condensation of the neutralized product with formaldehyde, sulphomethylation of the condensate.

According to a second preferred alternative form of the invention, the polyphenol (c) results from the condensation of sulphonated phenols with formaldehyde and nitrogenous organic bases. This polyphenol can be obtained in particular by:

production of phenolsulphonic acid by sulphonation of phenol, condensation of the sulphonic acid obtained with formaldehyde and urea, neutralization of the condensate with sodium hydroxide.

It can subsequently be reacidified and then decoloured with sodium bisulphite.

Use may also be made of the polyphenols described in the article "Synthetic Tannins", which appeared in Leather Science, 1971, Vol. 18, p. 8–16.

The content by weight of the polyphenol (c) with respect to the polymer (a) is generally between 3 and 22%.

The pulverulent compositions according to the invention can also comprise at least one polyoxyalkylenated surfactant (d).

It can be chosen from the following nonionic polyoxyalkylenated derivatives:

ethoxylated or ethoxy-propoxylated fatty alcohols,
ethoxylated or ethoxy-propoxylated triglycerides,
ethoxylated or ethoxy-propoxylated fatty acids,
ethoxylated or ethoxy-propoxylated sorbitan esters,
ethoxylated or ethoxy-propoxylated fatty amines,
ethoxylated or ethoxy-propoxylated di(1-phenylethyl) phenols,
ethoxylated or ethoxy-propoxylated tri(1-phenylethyl) phenols,
ethoxylated or ethoxy-propoxylated alkylphenols,
ethoxylated tristyrylphenols or ethoxylated distryrlphenols,
oxyethylene (OE)/oxypropylene (OP) diblocks,
OE/OP/OE triblocks.

The number of oxyethylene (OE) and/or oxypropylene (OP) units in these nonionic surfactants generally varies from 2 to 100. More particularly, the number of OE and/or OP units is between 2 and 50. The number of OE and/or OP units is preferably between 10 and 50.

The ethoxylated or ethoxy-propoxylated fatty alcohols generally comprise from 6 to 22 carbon atoms, the OE and OP units being excluded from these numbers. These units are preferably oxyethylene units.

The ethoxylated or ethoxy-propoxylated triglycerides can be triglycerides of vegetable or animal origin (such as lard, tallow, groundnut oil, butter oil, cottonseed oil, linseed oil, olive oil, fish oil, palm oil, grape seed oil, soybean oil, castor oil, rapeseed oil, copra oil or coconut oil) and are preferably ethoxylated.

The ethoxylated or ethoxy-propoxylated fatty acids are fatty acid (such as, for example, oleic acid or stearic acid) esters and are preferably ethoxylated.

The ethoxylated or ethoxy-propoxylated sorbitan esters are cyclized esters of sorbitol and of a fatty acid comprising from 10 to 20 carbon atoms, such as lauric acid, stearic acid or oleic acid, and are preferably ethoxylated.

The term "ethoxylated triglyceride" targets, in the present invention, both the products obtained by ethoxylation of a triglyceride with ethylene oxide and those obtained by a transesterification of a triglyceride with a polyethylene glycol.

Likewise, the term "ethoxylated fatty acid" includes both the products obtained by ethoxylation of a fatty acid with ethylene oxide and those obtained by transesterification of a fatty acid with a polyethylene glycol.

The ethoxylated or ethoxy-propoxylated fatty amines generally have from 10 to 22 carbon atoms, the OE and OP units being excluded from these numbers, and are preferably ethoxylated.

The ethoxylated or ethoxy-propoxylated alkylphenols generally have one or two linear or branched alkyl groups having 4 to 12 carbon atoms. Mention may in particular be made, by way of example, of octyl, nonyl or dodecyl groups.

Mention may in particular be made, as examples of nonionic surfactants of the group of the ethoxylated or ethoxy-propoxylated alkylphenols, ethoxylated or ethoxy-propoxylated di(1-phenylethyl)phenols and ethoxylated or ethoxy-propoxylated tri(1-phenylethyl)phenols, of di(1-phenylethyl)phenol ethoxylated with 5 OE units, di(1-phenylethyl)phenol ethoxylated with 10 OE units, tri(1-phenylethyl)phenol ethoxylated with 16 OE units, tri(1-phenylethyl)phenol ethoxylated with 20 OE units, tri(1-phenylethyl)phenol ethoxylated with 25 OE units, tri(1-phenylethyl)phenol ethoxylated with 40 OE units, tri(1-phenylethyl)phenols ethoxy-propoxylated with 25 OE+OP units, nonylphenol ethoxylated with 2 OE units, nonylphenol ethoxylated with 4 OE units, nonylphenol ethoxylated with 6 OE units, nonylphenol ethoxylated with 9 OE units, nonylphenols ethoxy-propoxylated with 25 OE+OP units, nonylphenols ethoxy-propoxylated with 30 OE+OP units, nonylphenols ethoxy-propoxylated with 40 OE+OP units, nonylphenols ethoxy-propoxylated with 55 OE+OP units, or nonylphenols ethoxy-propoxylated with 80 OE+OP units.

Use may also be made of an ionic surface-active agent chosen from polyoxyalkylenated derivatives as defined above, for example in the form of sulphonates, sulphates, phosphates or phosphonates, it being possible for the counterion to be chosen from K$^+$, Na$^+$ or NH$_4^+$.

The content by weight of the polyoxyalkylenated surface-active agent (d), expressed on a dry basis, with respect to the polymer (a) is generally between 1 and 10%, preferably between 3 and 6%.

The composition according to the invention can additionally comprise at least one inorganic filler (e) as a powder with a particle size of less than 20 μm.

The use is recommended, as inorganic filler, of a filler chosen from calcium carbonate, kaolin, barium sulphate, titanium oxide, talc, hydrated alumina, bentonite and calcium sulphoaluminate (satin white) or silica.

The presence of these inorganic fillers promotes the preparation of the powder and its stability on storage by preventing the aggregation of the powder, that is to say its caking.

The amount of inorganic filler (e) can be between 0.5 and 20% by weight, preferably between 5 and 15%, with respect to the water-insoluble film-forming polymer (a).

The particle size of the pulverulent composition according to the invention is generally less than 500 µm.

The pulverulent compositions according to the invention can be easily redispersed in water in the form of a reconstituted latex.

They can therefore be used directly in the form of a power or be premixed with water in order to form reconstituted latices. These powders are stable on storage: they remain redispersible after storage for several days at 55° C.

The invention also relates to the process for the preparation of the above pulverulent composition, in which process the water is removed from an aqueous dispersion of the water-insoluble film-forming polymer (a) prepared by emulsion polymerization and comprising appropriate amounts of naphthalenesulphonate (b) and optionally: of polyphenol (c), of ethoxylated surface-active agent (d) or of inorganic filler (e).

The starting point is therefore an aqueous dispersion of the water-insoluble film-forming polymer (a). This dispersion is obtained by emulsion polymerization. This type of dispersion is commonly known as a latex. In general, the naphthalenesulphonate (b) and optionally the polyphenol (c), the polyoxyalkylenated surface-active agent (d) and the inorganic filler (e) are added to the aqueous dispersion of the water-insoluble film-forming polymer (a). For the use of certain naphthalenesulphonates (b), such as sodium 1-naphthol-4-sulphonate, the pH of the aqueous polymer dispersion is adjusted to a pH of greater than 7 and preferably of greater than 8.5, before mixing it with the naphthalenesulphonate (b) and optionally: the polyphenol (c) and the surface-active agent (d). This neutralization can be carried out by addition of lime, sodium hydroxide or ammonia. It preferably relates to lime.

According to an alternative form of the invention, the polyoxyalkylenated surface-active agent (d) is added during the emulsion polymerization of the polymer (a) and therefore before the aqueous dispersion has formed.

The pulverulent compositions according to the invention can additionally comprise the additives which are standard in the targeted application, in particular biocides, microbiostars, bacteriostatic agents, UV stabilizers, antioxidants or silicone and organic antifoaming agents. In the case where such additives are used, they are added to the dispersion after the polymerization.

The respective contents of the various constituents are chosen so that the dried pulverulent compositions exhibit the contents defined previously. The starting point is preferably an emulsion exhibiting a solids content (film-forming polymer (a)+naphthalenesulphonate (b)+polyphenol (c)+ethoxylated surface-active agent (d)) of between 10 and 70% by weight, more preferably still between 40 and 60%.

The water of this dispersion is subsequently removed in order to obtain a powder. It is possible to use a process of freezing, followed by a stage of sublimation, or a process of lyophilization or a process of drying, for example of drying by atomization (spray drying). These processes can be followed by milling to the desired particle size.

Drying by atomization is the preferred process because it makes it possible to directly obtain the powder with the desired particle size without necessarily passing through the milling stage. Drying by atomization can be carried out in the usual way in any known device, such as, for example, an atomizing tower combining a nozzle or turbine spraying with a stream of hot gas. The inlet temperature of the hot gas (generally air), at the column top, is preferably between 100 and 150° C. and the outlet temperature is preferably between 55 and 90° C.

The inorganic filler can be added to the starting aqueous dispersion of the polymer (a). Preferably, all or part of the inorganic filler is introduced during the spraying stage in the process of drying by atomization. It is also possible to add the inorganic filler directly to the final pulverulent composition.

According to an alternative form of the process, the powder obtained can be granulated: in this case, it is possible to use a post-atomization fluid bed.

In the majority of cases, the pulverulent compositions according to the invention are completely redispersible in water at ambient temperature by simple stirring. The term "completely redispersible" is understood to mean a pulverulent composition in accordance with the invention which, after addition of an appropriate amount of water, makes it possible to obtain a reconstituted latex in which the size of the particles is substantially identical to the size of the latex particles present in the starting emulsion before drying.

The invention also relates to the reconstituted latex obtained by redispersion in water of a pulverulent composition as defined above.

Finally, the invention relates to the use of the pulverulent compositions described above as additives to hydraulic binders in the building, civil engineering or oil industry. The hydraulic binders can be in the form of grouts, mortars or concretes. The hydraulic binder is generally cement. The applications concerned are, for example, tiling bonding cements, smoothing and finishing coatings, adhesives and coatings for insulating complexes, repair mortars, leaktight coatings and grouts for the cementation of oil wells.

The pulverulent compositions of the invention or the reconstituted latices deriving therefrom can additionally be used in all the other fields of application of latices, more particularly in the field of adhesives, of compositions for the coating of paper, and of paints.

The following examples illustrate the invention without, however, limiting the scope thereof.

EXAMPLES

EXAMPLE 1

The starting point is a latex resulting from the emulsion polymerization of methyl methacrylate and of butyl acrylate, the polymerization not taking place in the presence of a polyoxyalkylenated surfactant. This latex exhibits the following characteristics:

mean size of the particles: 250 nm,
solids content: 50% by weight,
viscosity: 100 mPa·s,
pH=7.
15% by weight of sodium 4-amino-1-naphthalenesulphonate, with respect to the polymer of the latex, are introduced into the latex.

The dispersion obtained is converted into a powder by spray drying. This drying is carried out in an atomizing tower in which the inlet temperature of the hot air is 105° C. and the outlet temperature is 60° C.

During the atomization, kaolin particles with a size of between 2 and 3 μm are introduced into the tower in an amount such that the pulverulent composition, at the outlet of the atomizer, exhibits a kaolin content of 12% by weight.

Redispersibility Test

The pulverulent composition obtained is dispersed in water so as to obtain a reconstituted latex with a solids content of 30% by weight. Mixing is carried out using a magnetic stirrer for 15 min.

The particle size distribution of the particles in suspension in the reconstituted latex is monitored using a Coulter LS230 particle sizer. The mean size of the reconstituted latex is 250 nm.

The redispersibility is good.

EXAMPLE 2

Preparation of the Latex

A latex based on methyl methacrylate and on butyl acrylate is synthesized by emulsion polymerization in the presence of a fatty alcohol ethoxylated with 25 oxyethylene units (surfactant d1).

The characteristics of the latex obtained are as follows:

mean size of the particles: 150 nm,

The particle size distribution of the particles in suspension in the reconstituted latex is monitored using a Coulter LS230 particle sizer. The mean size in the reconstituted latex is 150 nm. The redispersibility is good.

EXAMPLES 3 TO 11

Example 2 is repeated by employing alternative forms:
  with regard to the nature of the latex, with regard to the nature of the ethoxylated surface-active agent (d),
  with regard to the moment of introduction of this agent,
  with or without sodium 4-amino-1-naphthalenesulphonate.

The size of the particles of the various starting latices is between 120 and 150 nm.

The conditions and results are combined in Table 1.

EXAMPLES 12 AND 13

Example 10 is repeated with the following alternative forms:
  the starting latex is neutralized to pH=9 by addition of lime,
  the naphthalenesulphonate is sodium 1-naphthol-4-sulphonate.

The conditions and results are combined in Table 1.

TABLE 1

|  | Latex | | | | Ethoxylated surface-active agent (d) | | | Addition of naphthalene | Mean size of the redispersed |
| --- | --- | --- | --- | --- | --- | --- | --- | --- | --- |
| Ex. | Nature | Solids content | Viscosity | pH | Amount | Nature | Addition | sulphonate | particles |
| 2 | MMA/BuA | 41.2% | 20 | 7 | 3.9% | d1 | to the polymerization | yes (ANS) | 150 nm |
| Comp. 3 | MMA/BuA | 41.2% | 20 | 7 | 3.9% | d1 | to the polymerization | no | 80 μm |
| 4 | MMA/BuA/AMPS | 45.3% | 31 | 7 | 3.5% | d1 | to the polymerization | yes (ANS) | 80% at 150 nm |
| Comp. 5 | MMA/BuA/AMPS | 45.3% | 70 | 7 | 3.5% | d1 | to the polymerization | no | 85 μm |
| 6 | SB | 49.4% | 70 | 6.8 | 4% | d1 | to the polymerization | yes (ANS) | 90% at 140 nm |
| Comp. 7 | SB | 49.4% | 70 | 6.8 | 4% | d1 | to the polymerization | no | 90 μm |
| 8 | SB | 49.7% | 90 | 7.7 | 4% | d2 | after polymerization | yes (ANS) | 150 nm |
| Comp. 9 | SB | 49.7% | 90 | 7.7 | 4% | d2 | after polymerization | no | 80 μm |
| 10 | SB | 49.7% | 90 | 7.7 | 4% | d2 | after polymerization | yes (ANS) | 120 nm |
| Comp. 11 | SB | 49.7% | 90 | 7.7 | 4% | d2 | after polymerization | no | 85 μm |
| 12 | SB | 49.7% | 90 | 9 | 4% | d2 | after polymerization | yes (NS) | 120 nm |
| Comp. 13 | SB | 49.7% | 90 | 9 | 4% | d2 | after polymerization | no | 85 μm | solids content: 41.2% by weight, viscosity: 20 mPa·s, pH=2.4, content of d1 with respect to the polymer of the latex: 3.9% by weight.

Preparation of the Pulverulent Composition

The pH of the latex is subsequently adjusted to approximately 7 by addition of an aqueous sodium hydroxide solution. 15% by weight of sodium 4-amino-1-naphthalenesulphonate, with respect to the polymer of the latex, are then introduced into the latex.

The dispersion obtained is converted into a powder according to the spraying process of Example 1.

The powder exhibits a mean particle size of 80 μm.

Redispersibility Test

The pulverulent composition obtained is dispersed in water according to the protocol of Example 1.

Meaning of the abbreviations in the table:

MMA: methyl methacrylate

B: butadiene

BuA: butyl acrylate

S: styrene

AMPS: sodium 2-acrylamido-2-methylpropanesulphonate, introduced in a proportion of 2% by weight with respect to the MMA+BuA mixture d1: fatty alcohol ethoxylated with 25 oxyethylene units d2: fatty alcohol ethoxylated with 16 oxyethylene units ANS: sodium 4-amino-1-naphthalenesulphonate NS: sodium 1-naphthol-4-sulphonate The viscosity is expressed in mPa·s.

The pH corresponds to the pH of the starting latex after adjustment by addition of sodium hydroxide.

The powders obtained in Examples 2, 8, 10 and 12 exhibit the following characteristics:

A excellent fluidity,

A good stability on storage,

A excellent wetting by water,

A spontaneous, rapid and complete redispersion, both in deionized water and in a concentrated CaCl$_2$ solution (1M). It is found that the mean size of the particles of the reconstituted latex is similar to that of the particles of the starting latex.

In the case of Examples 4 and 6, it is found that not all the particles are entirely redispersed. This is reflected, on the particle size curve, by the presence of two peaks corresponding to two populations with different particle sizes.

Thus, it is found that 80% by volume of the particles of Example 4 redisperse. With regard to this redispersed population, the mean size is 150 nm: there is virtually complete redispersion.

For Example 6, 90% by volume of the particles redisperse. With regard to this redispersed population, the mean size is 140 nm: here again, there is virtually complete redispersion.

The powders obtained in Comparative Examples 3, 5, 7, 9, 11 and 13 are not redispersible.

Use Properties of the Composition of Example 8

A mortar is prepared with the following composition:

| | |
|---|---|
| CPA 55 cement | 450 parts by weight |
| Standardized sand, NF-15-403 | 1350 parts by weight |
| Powder resulting from Example 8 | 22.5 parts by weight |
| water | 225 parts by weight |
| Rhoximat 700 DD antifoaming agent | 1 part by weight |

The properties of this mortar are compared with those of the mortar not comprising powder resulting from Example 7.

Measurement of the Density

The density is measured on the fresh cement, after mixing, by weighing in a predetermined volume.

TABLE 2

| | Density | | |
|---|---|---|---|
| | at 0 min | at 10 min | at 20 min |
| Standard mortar | 2.23 | 2.24 | 2.26 |
| Mortar with powder | 2.16 | 2.18 | 2.19 |

Measurement of the Plasticity

The plasticity is measured using a vibrator table on standardized mortar (NFP 15403). The mortar is introduced into a frustoconical mould, then demoulded and shaken using the vibrator table. The plasticity is the difference between the diameter of the mortar after collapse and that of the frustoconical mould. It is expressed as a percentage.

TABLE 3

| | Plasticity | | |
|---|---|---|---|
| | at 0 min | at 10 min | at 20 min |
| Standard mortar | 40 | 30 | 25 |
| Mortar with powder | 90 | 80 | 70 |

Measurement of the Setting Time

The setting time is measured using an automatic Vicat-type device according to NFP Standard 15431.

TABLE 4

| | Beginning of setting | End of setting |
|---|---|---|
| Standard mortar | 4h 30 | 6h 00 |
| Mortar with powder | 7h 00 | 9h 00 |

Measurement of the Mechanical Properties

Prismatic test specimens (4×4×16 cm$^3$) are prepared by casting the mortar or the grout in standard moulds made of mild steel. These test specimens are demoulded 1 hour after the setting time and are dried at ambient temperature. The mechanical properties are tested on these test specimens.

The tests are carried out in three-point flexion (NFP 18407) on the test specimens and in compression (NFP 15451) on six test half-specimens using a hydraulic test machine (200 kN).

TABLE 5

| | Flexion (MPa) | | Compression (MPa) | |
|---|---|---|---|---|
| | After 7 days | After 28 days | After 7 days | After 28 days |
| Standard mortar | 8 | 10 | 26 | 32 |
| Mortar with powder | 10 | 13 | 36 | 42 |

Measurement of the Adhesion

A 1 cm coating is prepared from the mortar or the grout to be tested on a concrete slab. One day later, a core sample is taken of the dry coating and a metal block is adhesively bonded to the core-sampled part. The block is subsequently pulled off using a device which measures the force exerted during this procedure: the force applied for an area of 20 to 25 cm$^2$ determines the value of the adhesion.

TABLE 6

| | Force for pulling off (MPa) after 7 days |
|---|---|
| Standard mortar | 1.2 |
| Mortar with powder | 2.0 |

These results are equivalent to those obtained with the latex before atomization, which proves the good redispersibility of the powder.

What is claimed is:

1. A water-redispersible pulverulent composition comprising:
    at least one water-insoluble film-forming polymer, said polymer (a) being prepared from at least one monomer with ethylenic unsaturation, and at least one naphthalenesulphonate (b) of general formula (I):

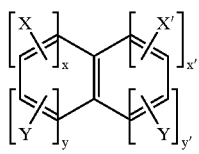

wherein:

X and X', which are identical or different, represent OH or NH$_2$,

Y represents SO$_3^-$M$^+$, with M alkali metal, x≧0, x'≧0 and x+x'≧1, and y≧0, y'≧0 and y+y'≧1.

2. A composition according to claim 1, wherein the monomer with ethylenic unsaturation is a vinyl ester, an acrylic ester, or a vinylaromatic monomer.

3. A composition according to claim 1, wherein the monomer with ethylenic unsaturation is an alkyl acrylate, or an alkyl methacrylate, whose alkyl group has from 1 to 10 carbon atoms.

4. A composition according to claim 1, wherein the water-insoluble film-forming polymer is a vinyl homopolymer, an acrylate homopolymer, a vinyl acetate homopolymer, a styrene/butadiene copolymer, a styrene/acrylate copolymer, or a styrene/butadiene/acrylate copolymer.

5. A composition according to claim 1, wherein the naphthalenesulphonate (b) is sodium 4-amino-1-naphthalenesulphonate or sodium 1-naphthol-4-sulphonate.

6. A composition according to claim 1, further comprising a synthetic or natural polyphenol (c).

7. A composition according to claim 6, wherein the polyphenol (c) is prepared by condensation of formaldehyde and of a compound of general formula (II):

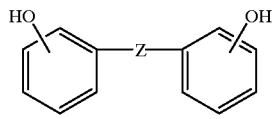

wherein Z represents SO$_2$, to obtain a condensate, and by sulphomethylation of the condensate.

8. A composition according to claim 7, wherein the polyphenol (c) is prepared by condensation of a sulphonated phenol with formaldehyde and a nitrogenous organic base.

9. A composition according to claim 1, further comprising a polyoxyalkylenated surface-active agent (d).

10. A composition according to claim 9, wherein the polyoxyalkylenated surface-active agent (d) is nonionic and is an ethoxylated fatty alcohol, ethoxy-propoxylated fatty alcohol, ethoxylated triglyceride, ethoxy-propoxylated triglyceride, ethoxylated fatty acid, ethoxy-propoxylated fatty acid, ethoxylated sorbitan ester, ethoxy-propoxylated sorbitan ester, ethoxylated fatty amine, ethoxy-propoxylated fatty amine, ethoxylated di(1-phenylethyl)phenol, ethoxy-propoxylated di(1-phenylethyl)phenol, ethoxylated tri(1-phenylethyl)phenol, ethoxy-propoxylated tri(1-phenylethyl) phenol, ethoxylated alkylphenol, ethoxy-propoxylated alkylphenol, ethoxylated tristyrylphenol, ethoxylated distyrylphenol, oxyethylene (OE)/oxypropylene (OP) diblock, or a OE/OP/OE triblock.

11. A composition according to claim 9, wherein the polyoxyalkylenated surface-active agent (d) is ionic.

12. A composition according to claim 9, wherein the content by weight of the polyoxyalkylenated surface-active agent (d), expressed on a dry basis, with respect to the polymer (a) is between 1 and 10%.

13. A composition according to claim 1, further comprising at least one inorganic filler (e) as a powder with a particle size of less than 20 µm.

14. A composition according to claim 6, further comprising a polyoxyalkylenated surface-active agent (d) and at least one inorganic filler (e) as a powder with a particle size of less than 20 µm.

15. A process for the preparation of a redispersible pulverulent composition as defined in claim 14, wherein the water is removed from an aqueous dispersion composed of the water-insoluble film-forming polymer (a) prepared by emulsion polymerization and comprising appropriate amounts of naphthalenesulphonate (b) of formula (I), of polyphenol (c), of surface-active agent (d) and of inorganic filler (e).

16. A process according to claim 15, wherein, before mixing the aqueous dispersion with the surface-active agent (d) and the naphthalenesulphonate (b), the pH of the aqueous dispersion is adjusted to a pH of greater than 7.

17. A process according to claim 15, wherein said process is a spray drying process.

18. A process according to any one of claim 15, wherein the polyoxyalkylenated surface-active agent (d) is added during the emulsion polymerization of the polymer (a).

19. A reconstituted latex obtained by redispersion in water of a pulverulent composition as defined in claim 1.

20. Hydraulic binders, adhesives, compositions for the coating of paper, and paints comprising a reconstituted latice as defined in claim 19.

21. Hydraulic binders, adhesives, compositions for the coating of paper, and paints comprising a pulverulent composition as defined in claim 1.

22. A cement comprising a reconstituted latice as defined in claim 19.

23. A cement comprising a pulverulent composition as defined in claim 1.

* * * * *